United States Patent
Banerjee et al.

(10) Patent No.: US 9,792,075 B1
(45) Date of Patent: Oct. 17, 2017

(54) SYSTEMS AND METHODS FOR SYNTHESIZING VIRTUAL HARD DRIVES

(71) Applicant: Symantec Corporation, Mountain View, CA (US)

(72) Inventors: Amitrajit Banerjee, Maharashtra (IN); Sujit Shembavnekar, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 296 days.

(21) Appl. No.: 14/191,362

(22) Filed: Feb. 26, 2014

(51) Int. Cl.
*G06F 3/06* (2006.01)

(52) U.S. Cl.
CPC .......... *G06F 3/0667* (2013.01); *G06F 3/0619* (2013.01); *G06F 3/0683* (2013.01)

(58) Field of Classification Search
CPC ..... G06F 3/0667; G06F 3/0619; G06F 3/0683
See application file for complete search history.

(56) References Cited

U.S. PATENT DOCUMENTS

| | | | | |
|---|---|---|---|---|
| 6,470,399 B1 * | 10/2002 | Tasler | ................... | G06F 3/0605 710/16 |
| 6,895,449 B2 * | 5/2005 | Tasler | ................... | G06F 3/0605 709/220 |
| 7,013,379 B1 * | 3/2006 | Testardi | ................ | G06F 3/0613 711/206 |
| 7,194,659 B2 * | 3/2007 | Buchanan, Jr. | ..... | G06F 11/1417 714/36 |
| 7,383,405 B2 * | 6/2008 | Vega | ..................... | G06F 9/4856 711/162 |
| 7,406,254 B2 * | 7/2008 | Yamagishi | ........... | G11B 27/105 386/224 |
| 7,805,598 B2 * | 9/2010 | Dandekar | ........... | G06F 11/0793 713/1 |
| 7,878,902 B2 * | 2/2011 | Mattice | ................... | G06F 21/64 463/29 |
| 8,166,285 B2 * | 4/2012 | Lee | .......................... | G06F 8/65 713/1 |
| 8,195,866 B2 * | 6/2012 | Ginzton | .............. | G06F 9/45533 709/230 |

(Continued)

OTHER PUBLICATIONS

Webopedia, "Snapshot Backup", Apr. 23, 2006, pp. 1-2, https://web.archive.org/web/20060423064957/http://www.webopedia.com/TERM/S/snapshot_backup.html.*

(Continued)

*Primary Examiner* — Christopher D Birkhimer
(74) *Attorney, Agent, or Firm* — FisherBroyles LLP

(57) ABSTRACT

A computer-implemented method for synthesizing virtual hard drives may include (1) identifying a data object as an underlying source for synthesizing a virtual hard drive to store data within the data object, (2) generating hard drive metadata for the synthetic virtual hard drive, (3) synthesizing the virtual hard drive as a representation of a virtual hard drive by associating the generated hard drive metadata with the data object as the underlying source such that a data management system is configured to: (a) direct requests for hard drive metadata of the synthetic virtual hard drive to the generated hard drive metadata, and (b) direct requests for hard drive content of the synthetic virtual hard drive to the data object as the underlying source for the synthetic virtual hard drive. Various other methods, systems, and computer-readable media are also disclosed.

20 Claims, 7 Drawing Sheets

(56) References Cited

U.S. PATENT DOCUMENTS

| | | | | |
|---|---|---|---|---|
| 8,327,355 B2* | 12/2012 | Dow | G06F 9/45533 | 709/201 |
| 8,504,746 B2* | 8/2013 | Tasler | G06F 3/0605 | 710/15 |
| 2002/0199037 A1* | 12/2002 | Tasler | G06F 3/0605 | 710/1 |
| 2004/0153840 A1* | 8/2004 | Buchanan, Jr. | G06F 11/1417 | 714/42 |
| 2005/0160199 A1* | 7/2005 | Tasler | G06F 3/0605 | 710/16 |
| 2005/0188248 A1* | 8/2005 | O'Brien | G06F 3/0607 | 714/5.11 |
| 2006/0005189 A1* | 1/2006 | Vega | G06F 9/4856 | 718/1 |
| 2006/0288148 A1* | 12/2006 | Tasler | G06F 3/0605 | 710/305 |
| 2007/0005823 A1* | 1/2007 | Tasler | G06F 3/0605 | 710/15 |
| 2007/0073978 A1* | 3/2007 | Lee | G06F 8/65 | 711/141 |
| 2007/0174580 A1* | 7/2007 | Shulga | G06F 3/0607 | 711/170 |
| 2008/0209088 A1* | 8/2008 | Tasler | G06F 3/0605 | 710/69 |
| 2008/0270674 A1* | 10/2008 | Ginzton | G06F 9/45533 | 711/6 |
| 2008/0273550 A1* | 11/2008 | Dandekar | G06F 11/0793 | 370/465 |
| 2010/0017800 A1* | 1/2010 | Dow | G06F 9/45533 | 718/1 |
| 2010/0211737 A1* | 8/2010 | Flynn | G06F 3/0616 | 711/114 |
| 2011/0131353 A1* | 6/2011 | Tasler | G06F 3/0605 | 710/69 |
| 2011/0202765 A1* | 8/2011 | McGrane | G06F 21/53 | 713/168 |
| 2011/0202916 A1* | 8/2011 | Voba | G06F 21/62 | 718/1 |
| 2012/0054475 A1* | 3/2012 | Lee | G06F 8/65 | 713/1 |
| 2012/0290802 A1* | 11/2012 | Wade | G06F 11/1471 | 711/162 |
| 2012/0303858 A1* | 11/2012 | Ginzton | G06F 9/45533 | 711/6 |
| 2013/0124812 A1* | 5/2013 | Grusy | G06F 12/0804 | 711/166 |
| 2013/0191607 A1* | 7/2013 | Walls | G06F 11/2087 | 711/162 |
| 2013/0226887 A1* | 8/2013 | Braam | H04L 67/1097 | 707/697 |
| 2013/0246704 A1* | 9/2013 | Kotzur | G06F 11/1076 | 711/114 |
| 2013/0297722 A1* | 11/2013 | Wright | G06F 11/1469 | 709/217 |

OTHER PUBLICATIONS

Kate Kershner, "What Is a Virtual Hard Drive?", Sep. 11, 2013, pp. 1-3, https://web.archive.org/web/20130911191044/http://computer.howstuffworks.com/virtual-hard-drive.htm/printable.*

AC&NC, "RAID Level 10: Very High Reliability Combined With High Performance", May 6, 2011, pp. 1-2, https://web.archive.org/web/20110506151247/http://www.acnc.com/raidedu/10.*

Paul Massiglia, "The RAID Book: A Storage System Technology Handbook", 6th Edition, 1997, RAID Advisory Board, pp. 26-27, 34-35, 150-155.*

Anonymous, "Emulation", Jun. 26, 2008, pp. 1-2, https://techterms.com/definition/emulation.*

\* cited by examiner

SYSTEMS AND METHODS FOR SYNTHESIZING VIRTUAL HARD DRIVES

BACKGROUND

Individuals and organizations often desire to store large amounts of data in formats that are efficient and convenient for use. For example, conventional storage systems may extract data from a physical hard drive and store it within a virtual hard drive.

Virtual hard drives may provide various efficiency and convenience improvements over traditional, physical hard drives. For example, virtual hard drives may be quickly and seamlessly transmitted or shared through a computer network instead of being physically transported like a physical hard disk. Virtual hard drives may also enable a single physical hard drive or machine to simulate a machine having multiple hard drives. In some cases, a user may quickly and seamlessly switch between virtual hard drives and/or boot machines from one or more virtual hard drives.

Despite the advantages discussed above, virtual hard drives may suffer from a number of inefficiencies. For example, virtual hard drives often contain large amounts of data, and creating a virtual hard drive may involve copying large amounts of data over an extended period of time. Moreover, different virtual hard drives may have different structures or formats, which may prevent their underlying content from being unified or used together in a quick and seamless manner. Accordingly, the instant disclosure identifies a need for improved methods for synthesizing virtual hard drives.

SUMMARY

As will be described in greater detail below, the instant disclosure generally relates to systems and methods for synthesizing virtual hard drives from one or more data objects that may be in different formats. In one example, a computer-implemented method for synthesizing virtual hard drives may include (1) identifying a data object as an underlying source for synthesizing a virtual hard drive to store data within the data object, (2) generating hard drive metadata for the synthetic virtual hard drive, and (3) synthesizing the virtual hard drive as a representation of a virtual hard drive by associating the generated hard drive metadata with the data object as the underlying source such that a data management system is configured to (a) direct requests for hard drive metadata of the synthetic virtual hard drive to the generated hard drive metadata and (b) direct requests for hard drive content of the synthetic virtual hard drive to the data object as the underlying source for the synthetic virtual hard drive.

In some examples, associating the generated hard drive metadata with the data object may include creating an instance of a data structure that represents the synthetic virtual hard drive. In further examples, associating the generated hard drive metadata with the data object may also include linking the generated hard drive metadata with the data object by storing to the instance of the data structure content and/or an identifier of the generated hard drive metadata, and optionally by further storing content and/or an identifier of the data object.

In some examples, linking the generated hard drive metadata with the data object may include storing a location of the data object to the instance of the data structure that represents the virtual hard drive. In some embodiments, directing requests for hard drive content of the synthetic virtual hard drive to the data object may include directing the requests to the location of the data object stored to the instance of the data structure that represents the synthetic virtual hard drive.

In some examples, the data object may include a physical hard drive. In some embodiments, the generated hard drive metadata for the synthetic virtual hard drive may be different than corresponding metadata for the physical hard drive.

In some examples, the data object may include one of a volume snapshot, an image, and/or a partition. In further examples, generating hard drive metadata for the synthetic virtual hard drive may include generating hard drive metadata that is structured to identify a location of the data object on a physical hard drive.

In some embodiments, the method may further include identifying another data object as another underlying source for synthesizing the virtual hard drive to store data within the other data object. In some examples, prior to synthesizing the virtual hard drive, the data object and the other data object may reside on separate storage devices. Moreover, generating hard drive metadata for the synthetic virtual hard drive may include generating hard drive metadata based on both the data object and the other data object. In further examples, generating hard drive metadata for the synthetic virtual hard drive may include creating an ordering of the data object and the other data object and generating hard drive metadata for the synthetic virtual hard drive based on the created ordering.

In some examples, generating hard drive metadata may include generating a new and original master boot record. In further examples, synthesizing the virtual hard drive may include determining which hard drive contents are missing from a totality of data objects for the synthetic virtual hard drive including the data object. Synthesizing the virtual hard drive may further include synthesizing the hard drive contents missing from the totality of data objects. Moreover, synthesizing the virtual hard drive may also include aggregating the synthesized hard drive contents missing from the totality of data objects with the totality of data objects.

In some embodiments, the method may further include receiving, by a translator, a request for data. The method may also include determining, by the translator, whether the request for data includes a request for hard drive content of the synthetic virtual hard drive or hard drive metadata of the synthetic virtual hard drive. In some examples, the method may also include directing, by the translator, the request for hard drive metadata of the synthetic virtual hard drive to the generated hard drive metadata based on the determination by the translator. In further examples, the method may also include directing, by the translator, the request for hard drive content of the synthetic virtual hard drive to the data object as the underlying source for the synthetic virtual hard drive based on the determination by the translator.

In one embodiment, a system for implementing the above-described method may include (1) an identification module, stored in memory, that identifies a data object as an underlying source for synthesizing a virtual hard drive to store data within the data object, (2) a generation module, stored in memory, that generates hard drive metadata for the synthetic virtual hard drive, (3) a synthesizing module, stored in memory, that synthesizes the virtual hard drive as a representation of a virtual hard drive by associating the generated hard drive metadata with the data object as the underlying source such that a data management system is configured to (a) direct requests for hard drive metadata of the synthetic virtual hard drive to the generated hard drive metadata and (b) direct requests for hard drive content of the synthetic virtual hard drive to the data object as the underlying source for the synthetic virtual hard drive, and (4) at least one physical processor that executes the identification module, the generation module, and the synthesizing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a data object as an underlying source for synthesizing a virtual hard drive to store data within the data object, (2) generate hard drive metadata for the synthetic virtual hard drive, and (3) synthesize the virtual hard drive as a representation of a virtual hard drive by associating the generated hard drive metadata with the data object as the underlying source such that a data management system is configured to (a) direct requests for hard drive metadata of the synthetic virtual hard drive to the generated hard drive metadata and (b) direct requests for hard drive content of the synthetic virtual hard drive to the data object as the underlying source for the synthetic virtual hard drive.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
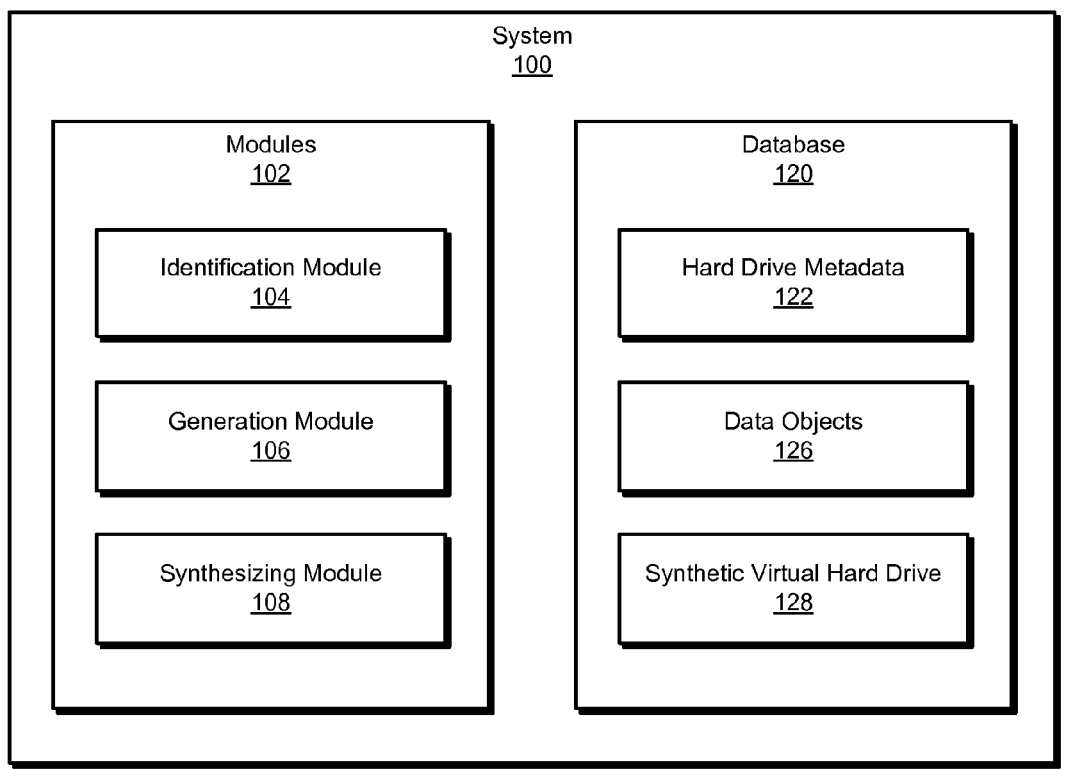
FIG. 1 is a block diagram of an exemplary system for synthesizing virtual hard drives.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for synthesizing virtual hard drives. As will be explained in greater detail below, the disclosed systems and methods may enable users to synthetically create a virtual hard drive almost instantaneously, and much faster than in conventional systems, by linking the virtual hard drive to the underlying data object(s) that form the content of the virtual hard drive. The disclosed systems and methods may also enable users to boot up a virtual machine, almost instantaneously, from the synthetic virtual hard drive.

Figure 2:
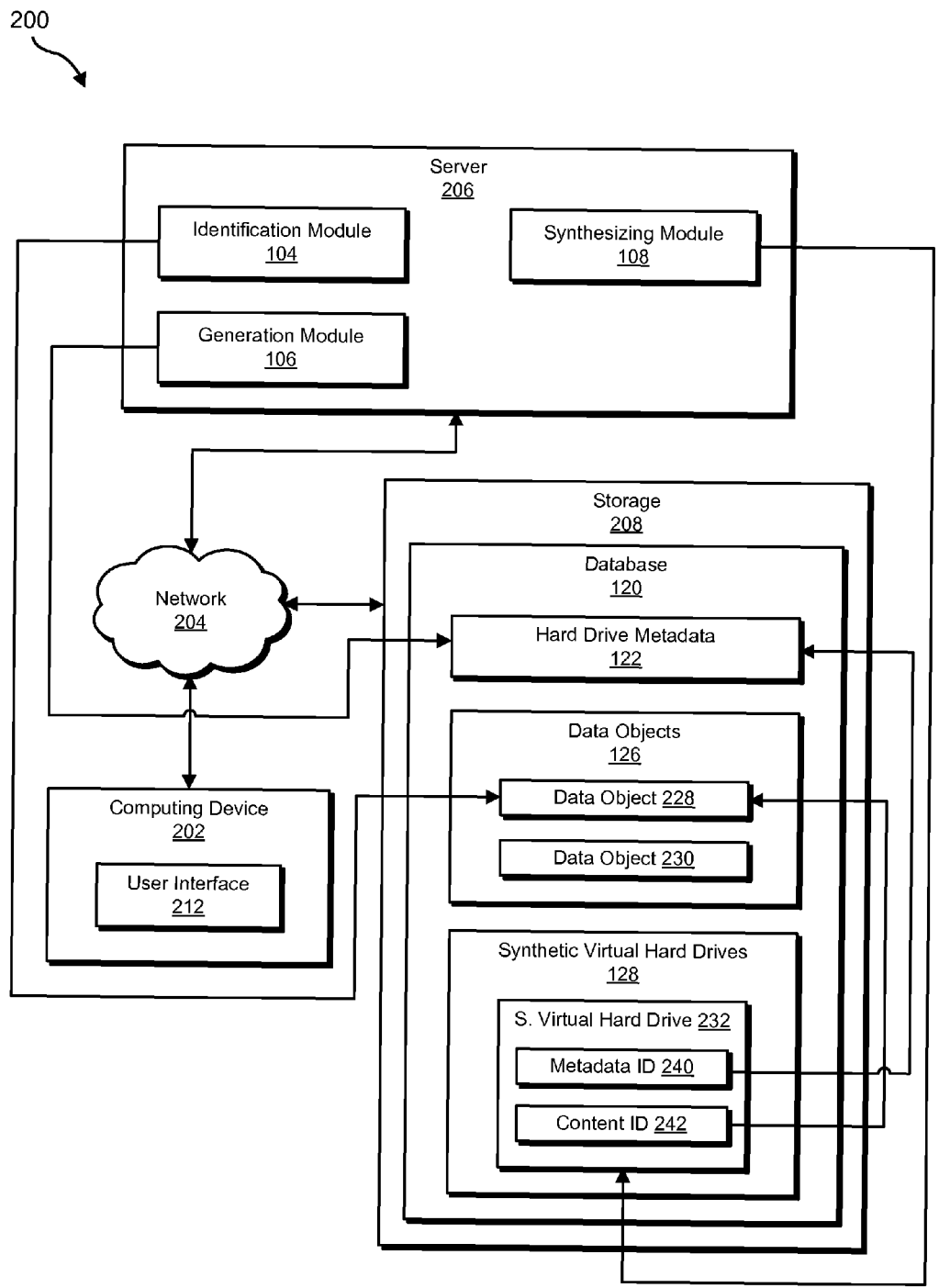
FIG. 2 is a block diagram of an additional exemplary system for synthesizing virtual hard drives.

The following will provide, with reference to FIGS. 1-2, detailed descriptions of exemplary systems for synthesizing virtual hard drives. Detailed descriptions of corresponding computer-implemented methods will also be provided in connection with FIG. 3. Detailed descriptions of an exemplary data storage system and work flow for synthesizing virtual hard drives will be provided in connection with FIG. 4. Moreover, detailed descriptions of an exemplary layout of an apparent virtual hard drive corresponding to a synthetic virtual hard drive will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for synthesizing virtual hard drives. As illustrated in this figure, exemplary system 100 may include one or more modules 102 for performing one or more tasks. For example, and as will be explained in greater detail below, exemplary system 100 may include an identification module 104 that may identify a data object as an underlying source for synthesizing a virtual hard drive to store data within the data object. Exemplary system 100 may also include a generation module 106 that may generate hard drive metadata for the synthetic virtual hard drive.

In addition, and as will be described in greater detail below, exemplary system 100 may include a synthesizing module 108 that may synthesize the virtual hard drive as a representation of a virtual hard drive by associating the generated hard drive metadata with the data object as the underlying source such that a data management system is configured to (a) direct requests for hard drive metadata of the synthetic virtual hard drive to the generated hard drive metadata and (b) direct requests for hard drive content of the synthetic virtual hard drive to the data object as the underlying source for the synthetic virtual hard drive. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store hard drive metadata 122, which may correspond to metadata for laying out, organizing, and/or locating underlying data or content on a hard drive. More generally, hard drive metadata 122 may include any header and/or footer, or other structural or organizational data, for a physical hard drive, virtual hard drive, and/or virtual hard drive container, as distinct from underlying content (e.g., conventional data within files and directories), that enables an input/output interface to read and process requests directed to the hard drive. Database 120 may be further configured to store data objects 126, which may correspond to physical, logical, file system, operating system, and/or software objects containing underlying data that may form the content for a synthetic virtual hard drive, as discussed further below. The various data objects in data objects 126 may be stored on different physical and/or virtual devices and/or systems, and be stored in different and/or incompatible physical or virtual formats. Furthermore, database 120 may be configured to store one or more of a synthetic virtual hard drives 128, which correspond to data structures or software objects that represent and/or simulate virtual hard drives (e.g., virtual hard disk files). As discussed above, virtual hard drives may simulate physical hard drives. Synthetic virtual hard drives may, therefore, meta-virtualize hard drives, by virtualizing data structures or files (e.g., virtual hard drives) that already simulate or emulate physical hard drives.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, modules 102 may reside server-side on server 206, while computing device 202 may be relatively thin, and enable a user to access server 206. In other examples, however, all or part of modules 102 may reside client-side. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to synthesize virtual hard drives. For example, and as will be described in greater detail below, one or more of modules 102 may cause computing device 202 and/or server 206 to identify a data object 228, from among data objects 126 (including another data object 230), as an underlying source for synthesizing a virtual hard drive, such as a synthetic virtual hard drive 232 (within synthetic virtual hard drives 128), to store data within data object 228. One or more of modules 102 may also cause computing device 202 and/or server 206 to generate hard drive metadata 122 for synthetic virtual hard drive 232 (in some examples, hard drive metadata 122 may include metadata for a number of synthetic virtual hard drives). One or more of modules 102 may also cause computing device 202 and/or server 206 to synthesize synthetic virtual hard drive 232 as a representation of a virtual hard drive by associating generated hard drive metadata 122 with data object 228 as the underlying source. One or more of modules 102 may also synthesize synthetic virtual hard drive 232 such that a data management system is configured to (a) direct requests for hard drive metadata 122 of synthetic virtual hard drive 232 to generated hard drive metadata 122, and to (b) direct requests for hard drive content of synthetic virtual hard drive 232 to data object 228 as the underlying source for synthetic virtual hard drive 232.

In the example of FIG. 2, a user or software may synthesize synthetic virtual hard drive 232 from one or more data objects, such as data object 228, as underlying sources. In some embodiments, the user may interact with system 200 to create and/or access synthetic virtual hard drives using a user interface 212. In some examples, the user or software may thereby create a functional equivalent of a virtual hard drive, but without copying the large amounts of data that may occupy one or more data objects. Instead, an overarching data management system (e.g., a virtualization system, file system, operating system, hypervisor, and/or virtual machine, and/or a translator configured to interface with one of these etc.) may redirect and/or translate requests for data for a virtual hard drive represented by synthetic virtual hard drive 232 to either generated hard drive metadata 122 and/or underlying data object 228. For example, the data management system and/or a translator within the data management system may use a metadata ID 240 and/or a content ID 242 to redirect and/or translate requests to the appropriate destination (e.g., hard drive metadata 122 or data object 228, including a specific location within one of those corresponding to the location reference in the request for data). In some examples, metadata ID 240 and/or content ID 242 may include a pointer and/or location for corresponding hard drive metadata 122 and content of data object 228. In other examples, synthetic virtual hard drive 232 may actually copy and include a copy of one or more of generated hard drive metadata 122 and/or data object 228 (while not copying and instead simulating a copy of part or all of a different or same data object). Because data at one or more data objects may change after creating synthetic virtual hard drive 232 (which, in some examples, represents a copy of all underlying data without actually copying the underlying data), one or more of modules 102 may create a snapshot of the data object, such as by capturing differences made to the data object after creation of synthetic virtual hard drive 232.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and managing virtual hard drives. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
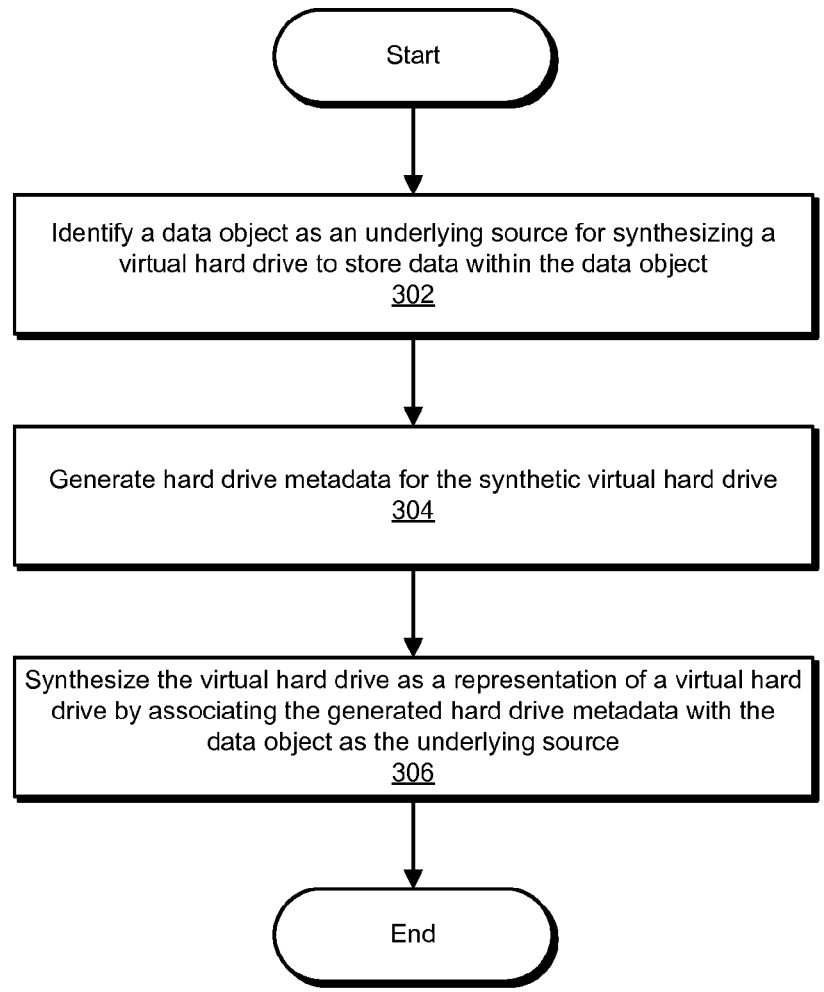
FIG. 3 is a flow diagram of an exemplary method for synthesizing virtual hard drives.

FIG. 3 is a flow diagram of an exemplary computer-implemented method 300 for synthesizing virtual hard drives. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a data object as an underlying source for synthesizing a virtual hard drive to store data within the data object. For example, identification module 104 may, as part of server 206 in FIG. 2, identify data object 228 as an underlying source for synthesizing synthetic virtual hard drive 232 to store data within data object 228.

As used herein, the phrase "data object" generally refers to any object or collection of data that may provide a data source for a synthetic virtual hard drive. Examples of data objects may include all or part of registers, registries, files, sectors, memory pages, partitions, volumes, arrays, physical hard drives, portable disks, drives, and/or mediums, virtual hard drives, images, and/or synthetic virtual hard drives. Note also that, as used herein, the phrase "synthetic virtual hard drive" generally refers to a data structure or functional entity that is distinct from both physical hard drives and conventional virtual hard drive files (e.g., VIRTUAL MACHINE DISK .VMDK files associated with VMWARE, VIRTUAL HARD DISK .VHD files associated with XEN and MICROSOFT products, and/or VIRTUAL DISK IMAGE .VDI files associated with ORACLE VM VIRTUALBOX products, etc.). In general, a synthetic virtual hard drive (and/or a translator interfacing with a synthetic virtual hard drive) dynamically transforms, translates, and/or redirects at least some hard drive operations (e.g., read/write operations) to simulate a virtual hard drive. In contrast, virtual hard drives are generally static, and can themselves simulate a physical hard drive, by storing all data associated with a physical hard drive.

Identification module 104 may identify data object 228 in a variety of ways. For example, identification module 104 may identify a physical hard drive as data object 228. Additionally, or alternatively, identification module 104 may identify one or more of a volume snapshot, an image, and a partition as data object 228. More generally, identification module 104 may identify any source for underlying data within synthetic virtual hard drive 232 as data object 228.

Figure 4:
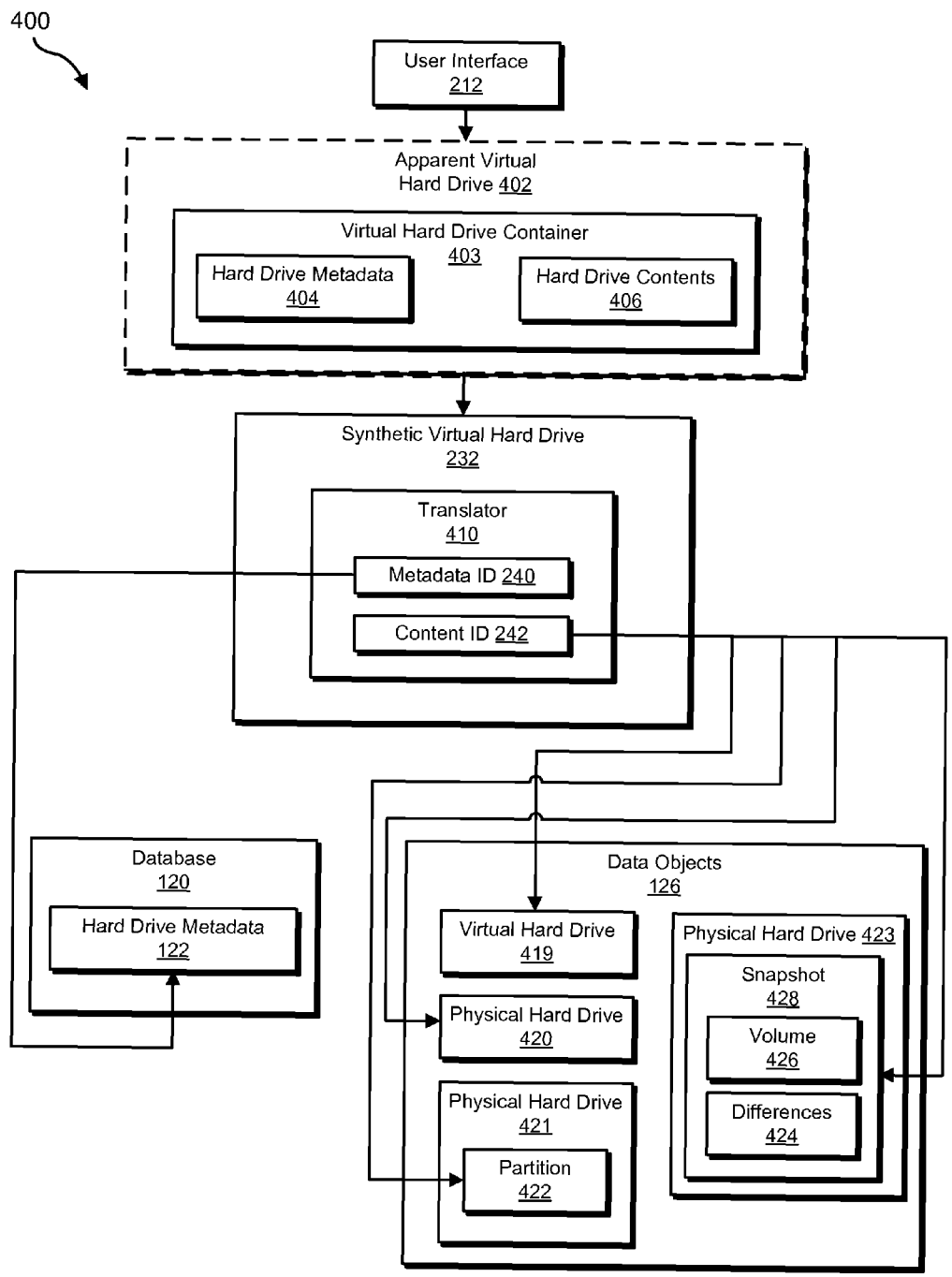
FIG. 4 is a block diagram of an exemplary data storage system and work flow for synthesizing virtual hard drives.

FIG. 4 is a block diagram showing a work flow 400 in which synthetic virtual hard drive 232 may receive requests, such as input/output requests, from user interface 212. Additionally, or alternatively, synthetic virtual hard drive 232 may similarly receive requests from an operating system, hypervisor, kernel, application, thread, peripheral device, and/or other software component or program. In general, work flow 400 in FIG. 4 proceeds from a higher level of abstraction (e.g., a user interface level) at the top of work flow 400, through lower and lower layers of abstraction, including finally the physical (or virtualized) storage of data in database 120 and data objects 126 (which may be stored within, or outside, database 120). In between, synthetic virtual hard drive 232 may simulate an apparent virtual hard drive 402 by revealing, presenting, and/or giving the appearance of apparent virtual hard drive 402 to higher levels of processing and/or to software components or services that make requests of synthetic virtual hard drive 232.

More specifically, synthetic virtual hard drive 232 may simulate, or process queries in a manner that gives the appearance of, apparent virtual hard drive 402, which may have a virtual hard drive container 403. Synthetic virtual hard drive 232 may also simulate apparent virtual hard drive 402 by simulating that apparent virtual hard drive 402 contains a specific arrangement of hard drive metadata 404 and/or hard drive contents 406, which may optionally be stored within virtual hard drive container 403 (which may, for example, contain the metadata for the container of a .VMDK, .VHD, or other virtual hard disk file). Notably, synthetic virtual hard drive 232 may simulate apparent virtual hard drive 402 such that apparent virtual hard drive 402 appears to exist as a specific file or arrangement of data on a physical drive or drives, even if there is no such file or arrangement of data stored at the physical (or lower virtualized) level, but only simulated by synthetic virtual hard drive 232. In fact, the data that forms the contents of apparent virtual hard drive 402 may be scattered across any number of devices, virtual machines, data objects, operating systems, and/or file systems, etc., without any single file system recognizing apparent virtual hard drive 402 as a file or single collection of data (i.e., without the functionality of synthetic virtual hard drive 232, which may interface with a file system and/or unite data sources that are otherwise separated within one or more file systems or operating systems).

Similarly, synthetic virtual hard drive 232 may simulate apparent virtual hard drive 402 immediately upon creating, and/or synthesizing, synthetic virtual hard drive 232, without moving and/or copying data from any data object (e.g., from data objects 126 into a virtual hard drive file). Instead, synthesizing synthetic virtual hard drive 232 may simply involve creating a mapping and/or enabling a translator that maps, reformats, translates, and/or redirects requests directed to apparent locations within apparent virtual hard drive 402 to requests to actual locations on a physical or other level (e.g., lower level of abstraction) than the level at which the request was made, thereby creating the simulation or illusion of apparent virtual hard drive 402 without actually creating a conventional virtual hard drive file within a file system.

As shown in FIG. 4, data objects 126 may include a virtual hard drive 419, a physical hard drive 420, a physical hard drive 421 and/or a partition 422 within physical hard drive 421, as well as a physical hard drive 423 and/or a snapshot 428 for a volume 426 within physical hard drive 423. Snapshot 428 may be implemented by tracking differences 424 made to volume 426 after creation of snapshot 428.

More generally, synthetic virtual hard drive 232 may enable snapshot functionality for all or part of any permutation of data objects 126 that form the underlying sources of data for synthetic virtual hard drive 232. Thus, all, some, or none of these data objects may be dynamic, e.g., without snapshotting, and change in synthetic virtual hard drive 232 when they change on the corresponding underlying data object. Alternatively, all, some, or none of these data objects may be static, e.g., through snapshotting, such that changes to the underlying data object do not propagate to synthetic virtual hard drive 232.

In general, identification module 104 may identify one or more data objects manually, semi-autonomously (e.g., prompting a user for confirmation after autonomously identifying a candidate data object), and/or autonomously. Manually, a user or other software component may select a data object. For example, a user may select a data object using a keyboard or mouse-type input device, using a window-type or command line interface. Identification module 104 may also autonomously identify one or more data objects according to one or more factors, including: user preferences, previous user behavior, estimated need or desire for one or more synthetic virtual hard drives, a default rule or setting, and/or a predefined business logic rule or heuristic.

Notably, identification module 104 may synthesize synthetic virtual hard drive 232 from just one data object as a source, or from a multitude of data objects, such as those in data objects 126. Thus, in some examples, identification module 104 may identify another data object as another underlying source for synthesizing the virtual hard drive to store data within the other data object. In the example of FIG. 4, identification module 104 may identify any two or more of data objects 126 as data objects forming underlying sources for synthetic virtual hard drive 232. In some examples, prior to synthesizing the virtual hard drive, data object 228 and the other data object may reside on separate storage devices. For example, physical hard drive 420, physical hard drive 421, and physical hard drive 423 may all constitute separate storage devices, but their contents may nonetheless form underlying sources of data for synthetic virtual hard drive 232 (e.g., without moving or copying all or part of their data into synthetic virtual hard drive 232).

Returning to FIG. 3, at step 304 one or more of the systems described herein may generate hard drive metadata for the synthetic virtual hard drive. For example, generation module 106 may, as part of server 206 in FIG. 2, generate hard drive metadata 122 for synthetic virtual hard drive 232.

Generation module 106 may generate the hard drive metadata in a variety of ways. In examples where data object 228 corresponds to a physical hard drive, generation module 106 may generate hard drive metadata for synthetic virtual hard drive 232 that is different than corresponding metadata for the physical hard drive. For example, in using all or part of contents of physical hard drive 420 as an underlying source for data for synthetic virtual hard drive 232, generation module 106 may generate metadata that is different than corresponding metadata for physical hard drive 420. In general, generation module 106 may generate metadata that is different by revising, editing, and/or altering corresponding metadata for physical hard drive 420 to reflect and/or accommodate differences between contents of synthetic virtual hard drive 232 (i.e., apparent virtual hard drive 402) and contents of physical hard drive 420. These differences may include differences in content and/or locations and/or ordering of content. For example, all or part of contents of physical hard drive 423 may be reordered and/or relocated within synthetic virtual hard drive (e.g., to accommodate one or more other data objects 126 within apparent virtual hard drive 402). Generation module 106 may similarly alter metadata for a virtual hard drive, such as virtual hard drive 419. Generation module 106 may similarly alter metadata for a physical and/or virtual hard drive to reflect changes, not to underlying content, but to a type and/or formatting of a file system, physical hard drive, and/or virtual hard drive (e.g., converting a .VMDK container to a .VHD container, while leaving contents essentially the same).

In some examples, the underlying data object may constitute something less than, or distinct from, a full physical or virtual hard drive (e.g., only part of a hard drive or other storage), such as a file, partition, volume, and/or volume snapshot. In that case, the underlying data object may lack its own preexisting hard drive metadata. Accordingly, generation module 106 may revise other hard drive metadata (from a hard drive on which the data object resides, or a different hard drive) to accommodate and/or reflect the inclusion of the file, partition, volume, and/or volume snapshot within synthetic virtual hard drive 232. Similarly, generation module 106 may generate metadata without revising preexisting metadata, and instead generate metadata by purely constructing the metadata to reflect the contents and/or arrangement of contents of synthetic virtual hard drive 232.

In some embodiments, generation module 106 may generate hard drive metadata for synthetic virtual hard drive 232 in part by generating hard drive metadata that is structured to identify a location of the data object on a physical hard drive, such as apparent virtual hard drive 402. In other words, generation module 106 may first establish a layout of data within apparent virtual hard drive 402, which may not exist as an actual virtual hard drive file, including locations of one or more data objects (and/or contents of data objects) within apparent virtual hard drive 402. Generation module 106 may then generate metadata based on the layout of data. In some examples, generation module 106 may generate hard drive metadata for the synthetic virtual hard drive in part by generating hard drive metadata based on both data object 228 and the other data object, such as data object 230.

Figure 5:
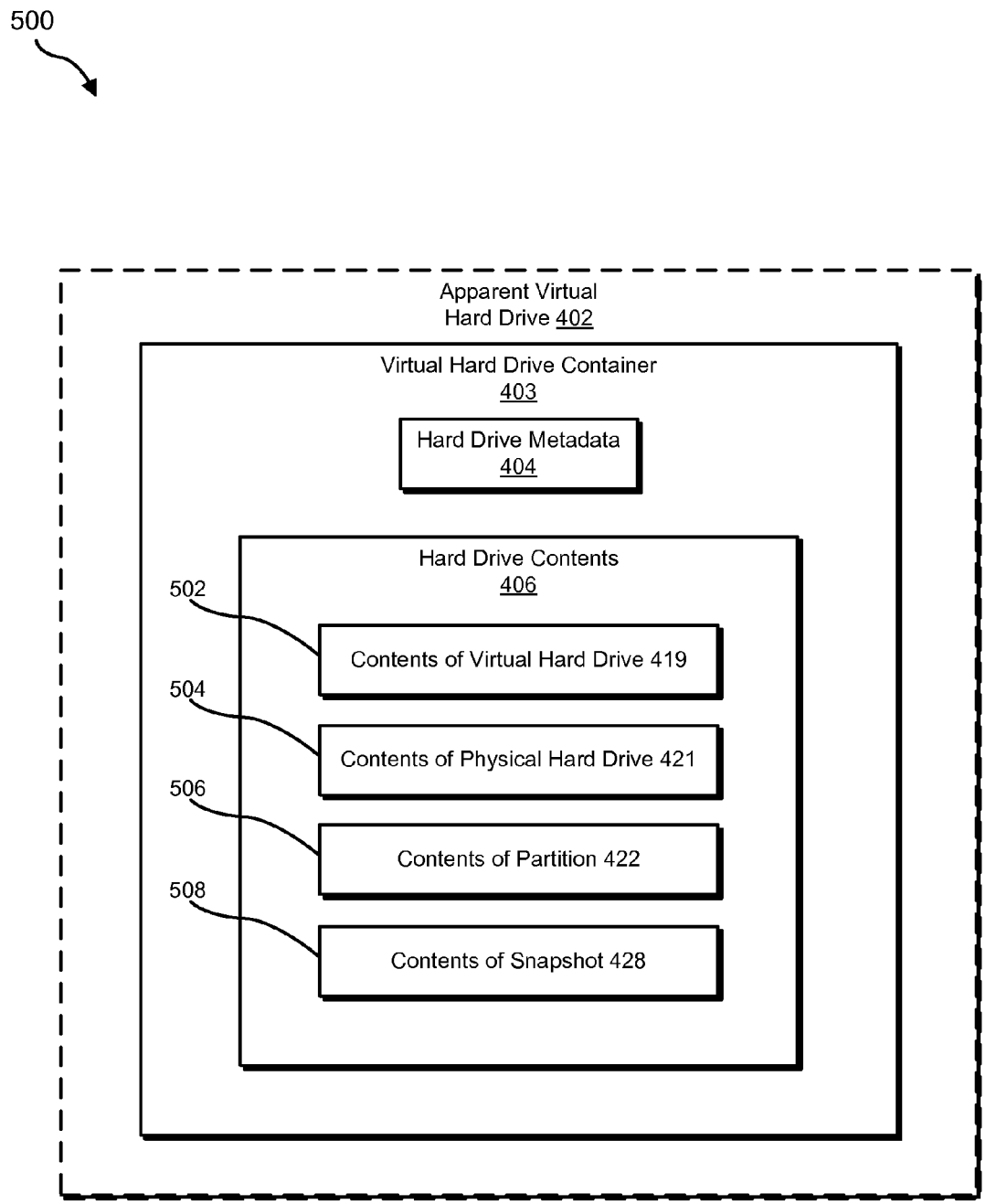
FIG. 5 is a block diagram of an exemplary layout of an apparent virtual hard drive corresponding to a synthetic virtual hard drive.

More specifically, in some embodiments, generation module 106 may generate hard drive metadata for the synthetic virtual hard drive in part by creating an ordering of data object 228 and the other data object 230. FIG. 5 shows an exemplary block diagram 500 of apparent virtual hard drive 402. As shown in FIG. 5, apparent virtual hard drive 402 may include an ordering and/or layout of hard drive metadata 404 and/or hard drive contents 406. One or more of modules 102, including generation module 106, may rearrange and/or order any permutation of hard drive metadata 404 and the items in hard drive contents 406, in any manner that is structured for processing as an actual physical or virtual hard drive (even if there is no actual physical or virtual hard drive storing the data in that arrangement, but instead the simulation of a virtual hard drive using synthetic virtual hard drive 232). Generation module 106 may, therefore, reorder contents 502, contents 504, contents 506, and/or contents 508, each of which may correspond to a data object from data objects 126 shown in FIG. 4.

Generation module 106 may also generate hard drive metadata for synthetic virtual hard drive 232 based on the created ordering. Generation module 106 may similarly place any data object, or contents thereof, adjacent to another data object, or contents thereof, thereby concatenating them within apparent virtual hard drive 402 (e.g., adjacent partitions). In other examples, generation module 106 may place padding, such as allocated or unallocated space, including zeroes, a default pattern, random bits, and/or preexisting bits, in between any two items or portions of contents. Generation module 106 may similarly interweave two or more items or portions of contents on apparent virtual hard drive 402 in any manner that preserves their separate readability according to a hard drive format or a file system, operating system, and/or input/output interface that interfaces with synthetic virtual hard drive 232 (e.g., while still treating synthetic virtual hard drive 232 as apparent virtual hard drive 402, and without knowledge or awareness of the simulation). For example, generation module 106 may lay out one or more files and/or sectors from one or more data objects in apparent virtual hard drive 402 in a defragmented state (which may include interweaving file contents). In general, generation module 106 and/or identification module 104 may identify any of the layout information discussed above (including ordering, fragmentation, and/or padding information) either manually or autonomously, in any manner that parallels those discussed above for identification module 104 and the identification of one or more data objects (e.g., user input, default settings or rules, user behavior and/or preferences, etc.).

In some examples, generation module 106 may generate hard drive metadata for synthetic virtual hard drive 232 at least in part by generating a new and original master boot record, including for example a protective master boot record. Additionally, or alternatively, generation module 106 may generate hard drive metadata for synthetic virtual hard drive 232 at least in part by generating a new and original globally unique identifiers (GUID) partition table. As used herein, the phrase "new and original" generally refers to master moot records and/or GUID partition tables that are distinct from that of any data object forming an underlying source for synthetic virtual hard drive 232 (e.g., one purely created by generation module 106 without being derived from a preexisting master boot record and/or GUID partition table, and/or being derived from one by modifying the same to reflect differences between source hard drive and apparent virtual hard drive 402).

In general, generation module 106 may lay out one or more partitions on apparent virtual hard drive 402, such that one or more sector-layer data objects, such as images or preexisting partitions, are placed within the newly laid out partitions. Generation module 106 may use preexisting sector-layer data objects, such as images, for placing within one of the newly created partitions, without modifying the preexisting sector-layer data object, and/or may generate new and original sector-layer data objects based on other data objects, such as files, while making any desired modifications and/or rearrangements of data (e.g. by taking a snapshot of the data object and then recording further changes within hard drive metadata 122). As used herein, the phrase "sector-layer data object" generally refers to any data object that includes not only the contents of data but also a logical or physical arrangement of that data (e.g., as on a physical hard drive).

More generally, generation module 106 may generate hard drive metadata to include specific locations, and/or other metadata, for one or more partitions on apparent virtual hard drive 402, which may serve as containers for receiving contents from one or more underlying data objects, in any order or arrangement identified by one or more modules 102. Generation module 106 may similarly create new and original boot records and/or BOOT CONFIGURATION DATA entries, and/or modify and/or correct the same based on a generated layout for contents of apparent virtual hard drive 402. Notably, generation module 106 may generate metadata for virtual hard drive container 403 in addition to, or as part of, hard drive metadata 404 in a manner parallel to generating hard drive metadata 404.

Returning to FIG. 3, at step 306 one or more of the systems described herein may synthesize the virtual hard drive as a representation of a virtual hard drive by associating the generated hard drive metadata with the data object as the underlying source. For example, synthesizing module 108 may synthesize the synthetic virtual hard drive 128 as a representation of a virtual hard drive by associating generated hard drive metadata 122 with data object 228 as the underlying source. Moreover, synthesizing module 108 may synthesize virtual hard drive 232 such that a data management system is configured to (a) direct requests for hard drive metadata 122 of synthetic virtual hard drive 232 to generated hard drive metadata 122, and to (b) direct requests for hard drive content of synthetic virtual hard drive 232 to data object 228 as the underlying source for synthetic virtual hard drive 232.

Synthesizing module 108 may synthesize synthetic virtual hard drive 232 in a variety of ways. In some embodiments, synthesizing module 108 may synthesize synthetic virtual hard drive 232 in part by associating generated hard drive metadata 122 with data object 228. Moreover, synthesizing module 108 may associate generated hard drive metadata 122 with data object 228 at least in part by creating an instance of a data structure that represents synthetic virtual hard drive 232. In general, the data structure may include any file, record, registry entry, database, instantiated programming language (e.g., object-oriented language) object, and/or other data structure that may associate two items as correlated with each other. Similarly, synthesizing module 108 may associate generated hard drive metadata 122 with data object 228 at least in part by linking generated hard drive metadata 122 with data object 228 by storing to the instance of the data structure content of generated hard drive metadata 122, an identifier of generated hard drive metadata 122, content of data object 228, and/or an identifier of data object 228.

In the example of FIG. 4, synthetic virtual hard drive 232 may include metadata ID 240 and/or content ID 242, which may identify hard drive metadata 122 and various data objects 126, respectively. In some examples, synthesizing module 108 may also associate generated hard drive metadata 122 with data object 228 in part by linking generated hard drive metadata 122 with data object 228 in part by storing a location of data object 228 to the instance of the data structure that represents the virtual hard drive. Metadata ID 240 and/or content ID 242 may generally include a name, identifier, contents (partial or entire), reference, link, location, and/or pointer for corresponding metadata and contents.

In further embodiments, synthesizing module 108 may synthesize synthetic virtual hard drive 232 such that a data management system directs requests for hard drive content of synthetic virtual hard drive 232 to data object 228 at least in part by directing the requests to the location of data object 228 stored to the instance of the data structure that represents synthetic virtual hard drive 232. As used herein, the phrase "data management system" generally refers to any system that receives read, write, and/or other requests for data formatted for accessing apparent virtual hard drive 402 and/or processes those requests through synthetic virtual hard drive 232, thereby simulating apparent virtual hard drive 402. In some examples, the data management system may include a translator 410, as shown in FIG. 4, which may redirect (e.g., reformat, modify, and/or alter a direction of) requests for metadata and/or content. Translator 410 may form part of synthetic virtual hard drive 232 (e.g., as a method or function of the data structure representing synthetic virtual hard drive 232), or may be external to synthetic virtual hard drive 232 (e.g., as a filter driver that intercepts input/output operations formatted for apparent virtual hard drive 402, and processes them through synthetic virtual hard drive 232). For example, translator 410 may translate requests by redirecting them to generated hard drive metadata 122 and/or various data objects 126, such as by using metadata ID 240 and/or content ID 242.

In some examples, synthesizing module 108 may synthesize the virtual hard drive in part by determining which hard drive contents are missing from a totality of data objects for the synthetic virtual hard drive including the data object. For example, synthesizing module 108 may determine whether a particular data object lacks a corresponding master boot record, GUID partition table, other boot records, BOOT CONFIGURATION DATA records, and/or locations, entries, and/or metadata associated with any of these. Synthesizing module 108 may then synthesize the virtual hard drive in part by synthesizing the hard drive contents missing from the totality of data objects. Similarly, synthesizing module 108 may synthesize the virtual hard drive at least in part by aggregating the synthesized hard drive contents missing from the totality of data objects with the totality of data objects. In other words, synthesizing module 108 may aggregate the newly synthesized (and previously missing) metadata with one or more data objects that previously lacked the corresponding metadata. In the end, the entirety of apparent virtual hard drive 402 may be simulated as a complete representation of a virtual hard drive, with gaps in data objects 126 having been supplemented or filled by synthesizing module 108.

In some embodiments, synthesizing module 108 may synthesize synthetic virtual hard drive 232 such that a data management system is configured to receive, through translator 410, a request for data. Translator 410 may determine whether the request for data includes a request for hard drive content (e.g., within various data objects 126) of the synthetic virtual hard drive or hard drive metadata 122 of synthetic virtual hard drive 232. Translator 410 may also direct a request for hard drive metadata of synthetic virtual hard drive 232 to generated hard drive metadata 122 based on the determination by translator 410. Translator 410 may also direct a request for hard drive content of synthetic virtual hard drive 232 to data object 228 (from among data objects 126) as the underlying source for synthetic virtual hard drive 232 based on the determination by translator 410.

In one specific embodiment, the disclosed systems and methods may convert a physical hard drive to a virtual hard drive by synthesizing the virtual hard drive, as discussed above for FIG. 3. More specifically, the systems and methods may take a snapshot of the physical hard drive (or other data object). A virtual disk translator, or other software, may then access one or more volumes on the snapshot, and use them as underlying data sources for synthesizing the synthetic virtual hard drive. Lastly, the systems and methods may boot up a virtual machine using the newly synthesized virtual hard drive.

As described above, the disclosed systems and methods may enable users to synthetically create a virtual hard drive almost instantaneously, and much faster than in conventional systems, by linking the virtual hard drive to the underlying data object(s) that form the content of the virtual hard drive. The disclosed systems and methods may also enable users to boot up a virtual machine, almost instantaneously, from the synthetic virtual hard drive.

Figure 6:
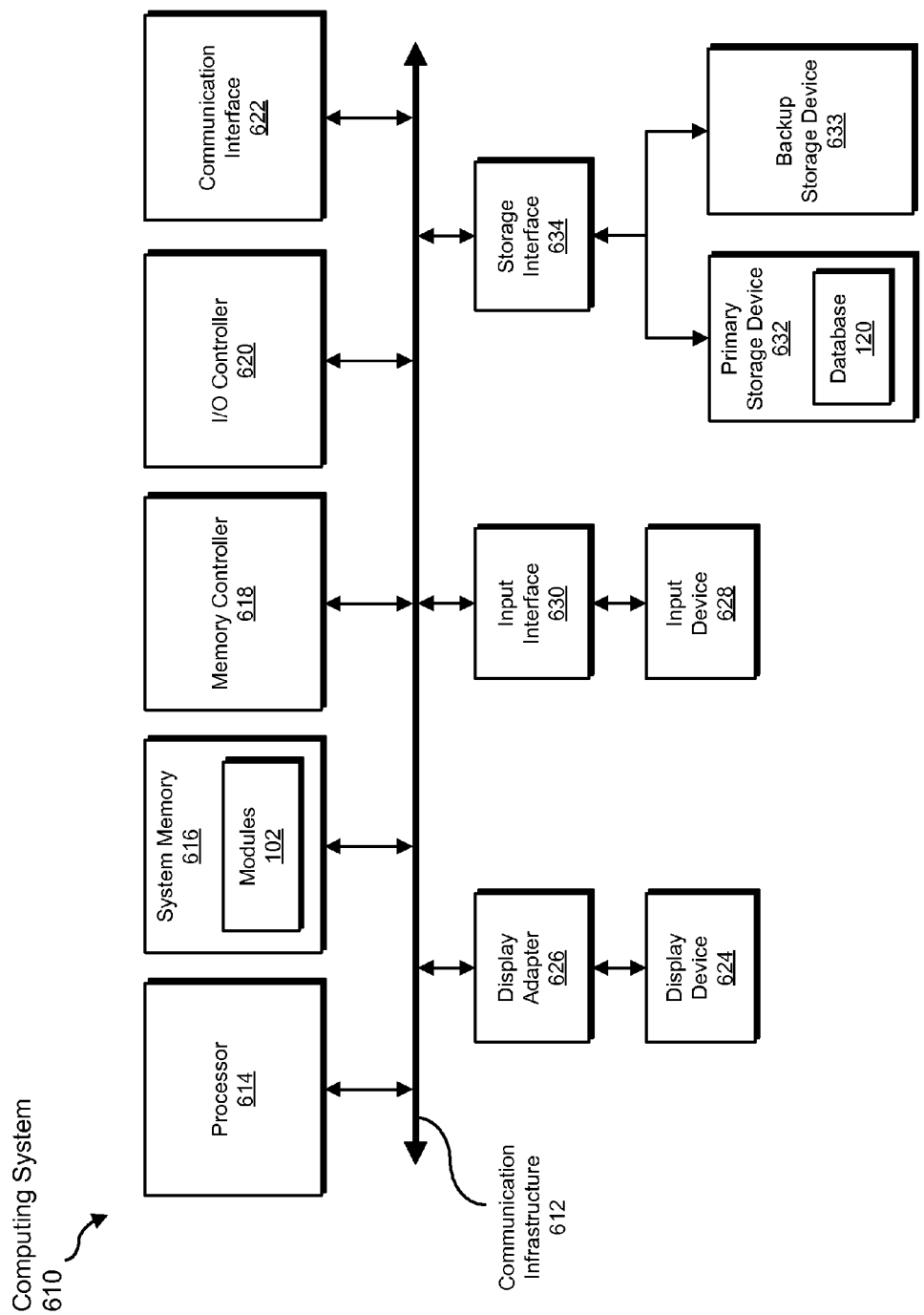
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
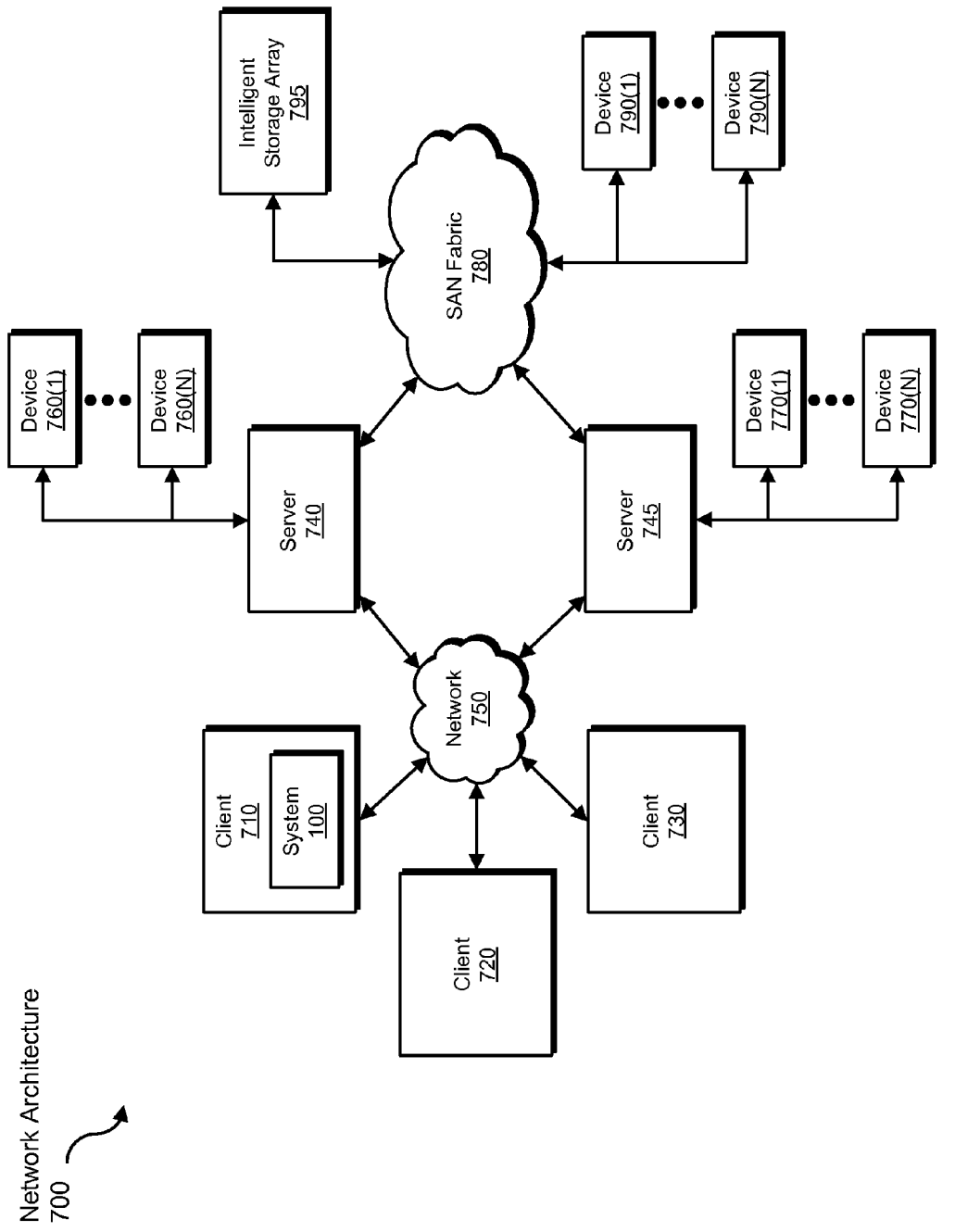
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for synthesizing virtual hard drives.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request for data or metadata of an apparent virtual hard drive, transform the request, output a result of the transformation to a storage or output device (e.g., a display), use the result of the transformation to synthesize a virtual hard drive, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for synthesizing virtual hard disk drive files, at least a portion of the method being performed by a computing device comprising at least one processor, the method comprising:
   identifying distinct data objects as underlying sources for synthesizing a virtual hard disk drive file to create a synthetic virtual hard disk drive file to store data within the distinct data objects;
   generating hard drive metadata for the synthetic virtual hard disk drive file at least in part by correcting at least one of a boot record and a boot configuration data entry for the synthetic virtual hard disk drive file based on a generated layout for contents of the virtual hard disk drive file;

synthesizing the virtual hard disk drive file, such that the synthetic virtual hard disk drive file simulates, through meta-virtualization, the virtual hard disk drive file even though the virtual hard disk drive file does not actually exist within an underlying file system, by associating the generated hard drive metadata with the distinct data objects as the underlying sources such that a data management system is configured to:
  direct requests for hard drive metadata of the synthetic virtual hard disk drive file to the generated hard drive metadata;
  direct, through translation, requests for hard drive content of the synthetic virtual hard disk drive file to the distinct data objects as the underlying sources for the synthetic virtual hard disk drive file.

2. The method of claim 1, wherein associating the generated hard drive metadata with the distinct data objects comprises:
  creating an instance of a data structure that represents the synthetic virtual hard disk drive file;
  linking the generated hard drive metadata with the distinct data objects by storing to the instance of the data structure at least one of:
    at least one of content and an identifier of the generated hard drive metadata;
    at least one of content and an identifier of the distinct data objects.

3. The method of claim 2, wherein:
  linking the generated hard drive metadata with the distinct data objects comprises storing a location of the distinct data objects to the instance of the data structure that represents the virtual hard disk drive file;
  directing, through translation, requests for hard drive content of the synthetic virtual hard disk drive file to the distinct data objects comprises directing, through translation, the requests to the location of the distinct data objects stored to the instance of the data structure that represents the synthetic virtual hard disk drive file.

4. The method of claim 1, wherein:
  the distinct data objects comprise a physical hard drive;
  the generated hard drive metadata for the synthetic virtual hard disk drive file is different than corresponding metadata for the physical hard drive.

5. The method of claim 1, wherein the synthetic virtual hard disk drive file simulates at least one of:
  a VIRTUAL MACHINE DISK file;
  a VIRTUAL HARD DISK file;
  a VIRTUAL DISK IMAGE file.

6. The method of claim 1, further comprising identifying another data object as another underlying source for synthesizing the virtual hard disk drive file to store data within the other data object.

7. The method of claim 6, wherein, prior to synthesizing the virtual hard disk drive file, the distinct data objects and the other data object reside on separate storage devices.

8. The method of claim 6, wherein generating hard drive metadata for the synthetic virtual hard disk drive file comprises generating hard drive metadata based on both the distinct data objects and the other data object.

9. The method of claim 6, wherein generating hard drive metadata for the synthetic virtual hard disk drive file comprises:
  creating an ordering of the distinct data objects and the other data object;
  generating hard drive metadata for the synthetic virtual hard disk drive file based on the created ordering.

10. The method of claim 1, wherein generating hard drive metadata comprises generating a new and original master boot record.

11. The method of claim 1, wherein synthesizing the virtual hard disk drive file comprises:
  determining which hard drive contents are missing from a totality of data objects for the synthetic virtual hard disk drive file including the distinct data objects;
  synthesizing the hard drive contents missing from the totality of data objects;
  aggregating the synthesized hard drive contents missing from the totality of data objects.

12. The method of claim 1, further comprising:
  receiving, by a translator, a request for data;
  determining, by the translator, whether the request for data comprises a request for hard drive content of the synthetic virtual hard disk drive file or hard drive metadata of the synthetic virtual hard disk drive file.

13. The method of claim 12, further comprising directing, by the translator, the request for hard drive metadata of the synthetic virtual hard disk drive file to the generated hard drive metadata based on the determination by the translator.

14. The method of claim 12, further comprising redirecting, by the translator, the request for hard drive content of the synthetic virtual hard disk drive file to the distinct data objects as the underlying sources for the synthetic virtual hard disk drive file based on the determination by the translator.

15. A system for synthesizing virtual hard disk drive files, the system comprising:
  an identification module, stored in memory, that identifies distinct data objects as underlying sources for synthesizing a virtual hard disk drive file to create a synthetic virtual hard disk drive file to store data within the distinct data objects;
  a generation module, stored in memory, that generates hard drive metadata for the synthetic virtual hard disk drive file at least in part by correcting at least one of a boot record and a boot configuration data entry for the synthetic virtual hard disk drive file based on a generated layout for contents of the virtual hard disk drive file;
  a synthesizing module, stored in memory, that synthesizes the virtual hard disk drive file, such that the synthetic virtual hard disk drive file simulates, through meta-virtualization, the virtual hard disk drive file even though the virtual hard disk drive file does not actually exist within an underlying file system, by associating the generated hard drive metadata with the distinct data objects as the underlying sources such that a data management system is configured to:
    direct requests for hard drive metadata of the synthetic virtual hard disk drive file to the generated hard drive metadata;
    direct, through translation, requests for hard drive content of the synthetic virtual hard disk drive file to the distinct data objects as the underlying sources for the synthetic virtual hard disk drive file;
  at least one physical processor that executes the identification module, the generation module, and the synthesizing module.

16. The system of claim 15, wherein:
  the distinct data objects comprise a physical hard drive;
  the generated hard drive metadata for the synthetic virtual hard disk drive file is different than corresponding metadata for the physical hard drive.

17. The system of claim 15, wherein:
the distinct data objects comprise at least one of a volume snapshot, an image, and a partition;
the generation module generates hard drive metadata for the synthetic virtual hard disk drive file at least in part by generating hard drive metadata that is structured to identify a location of the distinct data objects on a physical hard drive.

18. The system of claim 15, wherein the identification module further identifies another data object as another underlying source for synthesizing the virtual hard disk drive file to store data within the other data object.

19. The system of claim 18, wherein the generation module generates hard drive metadata for the synthetic virtual hard disk drive file at least in part by generating hard drive metadata based on both the distinct data objects and the other data object.

20. A non-transitory computer-readable medium comprising one or more computer-executable instructions that, when executed by at least one processor of a computing device, cause the computing device to:
identify distinct data objects as underlying sources for synthesizing a virtual hard disk drive file to create a synthetic virtual hard disk drive file to store data within the distinct data objects;
generate hard drive metadata for the synthetic virtual hard disk drive file at least in part by correcting at least one of a boot record and a boot configuration data entry for the synthetic virtual hard disk drive file based on a generated layout for contents of the virtual hard disk drive file;
synthesize the virtual hard disk drive file, such that the synthetic virtual hard disk drive file simulates, through meta-virtualization, the virtual hard disk drive file even though the virtual hard disk drive file does not actually exist within an underlying file system, by associating the generated hard drive metadata with the distinct data objects as the underlying sources such that a data management system is configured to:
direct requests for hard drive metadata of the synthetic virtual hard disk drive file to the generated hard drive metadata;
direct, through translation, requests for hard drive content of the synthetic virtual hard disk drive file to the distinct data objects as the underlying sources for the synthetic virtual hard disk drive file.

\* \* \* \* \*